(12) United States Patent
Hartmann et al.

(10) Patent No.: US 7,264,149 B2
(45) Date of Patent: Sep. 4, 2007

(54) SAW IDENTIFICATION TAG DISCRIMINATION METHODS

(76) Inventors: Clinton S. Hartmann, 5419 Ridgedale Dr., Dallas, TX (US) 75206; John C. Bellamy, 141 Meadow Creek, Coppell, TX (US) 75019

(*) Notice: Subject to any disclaimer, the term of this patent is extended or adjusted under 35 U.S.C. 154(b) by 0 days.

(21) Appl. No.: 10/941,801

(22) Filed: Sep. 15, 2004

(65) Prior Publication Data
US 2005/0056695 A1    Mar. 17, 2005

Related U.S. Application Data

(60) Provisional application No. 60/503,136, filed on Sep. 15, 2003.

(51) Int. Cl.
*G06F 17/00*    (2006.01)
(52) U.S. Cl. .................. 235/375; 310/313 D
(58) Field of Classification Search .......... 235/375, 235/376, 377, 435, 437, 451, 487, 492; 310/313 D, 310/313 R; 340/568.66, 870.3
See application file for complete search history.

(56) References Cited

U.S. PATENT DOCUMENTS

| | | | |
|---|---|---|---|
| 3,742,498 A | 6/1973 | Dunn | |
| 4,618,841 A * | 10/1986 | Riha | ............... 333/195 |
| 4,625,208 A | 11/1986 | Skeie et al. | |
| 4,677,656 A | 6/1987 | Burke et al. | |
| 4,737,790 A | 4/1988 | Skeie et al. | |
| 4,949,356 A | 8/1990 | Long | |
| 5,113,278 A | 5/1992 | Degura et al. | |
| 5,138,215 A * | 8/1992 | Mariani | ............... 310/313 D |
| 5,684,871 A | 11/1997 | Devon et al. | |
| 5,712,871 A | 1/1998 | Chang | |
| 5,890,071 A | 3/1999 | Shimanuki | |
| 5,926,301 A | 7/1999 | Hirt | |
| 6,064,662 A | 5/2000 | Gitlin et al. | |
| 6,121,892 A * | 9/2000 | Reindl et al. | ............... 340/5.8 |
| 6,144,332 A | 11/2000 | Reindl et al. | |
| 6,208,062 B1 | 3/2001 | Nysen et al. | |
| 6,295,318 B1 | 9/2001 | Wingard | |
| 6,341,023 B1 | 1/2002 | Puc | |
| 6,366,205 B1 * | 4/2002 | Sutphen | ............ 340/568.6 |
| 6,377,203 B1 * | 4/2002 | Doany | ............... 342/44 |
| 6,442,145 B1 * | 8/2002 | De Lange et al. | .......... 370/310 |
| 6,455,979 B2 * | 9/2002 | Reindl et al. | .......... 310/313 D |

(Continued)

FOREIGN PATENT DOCUMENTS

DE    196 22 154 A1    5/1997

(Continued)

OTHER PUBLICATIONS

Antonio Garcia-Zambrana, et al.; "Improving PPM Schemes in Wireless Infrared Links at High Bit Rates" IEEE Communications Letters, vol. 5, No. 3, Mar. 2001; pp. 95-97.

(Continued)

*Primary Examiner*—Steven S. Paik (57) ABSTRACT

Surface acoustic wave (SAW) identification tag discrimination methods including, in one embodiment (1) detecting a signal emanating from an electronic device operating within a SAW tag frequency band; (2) identifying a null period in a transmission pattern in the signal; and (3) effecting communication of information during the null period.

14 Claims, 5 Drawing Sheets

U.S. PATENT DOCUMENTS

| | | |
|---|---|---|
| 6,630,900 B2 | 10/2003 | Stierlin et al. |
| 6,633,226 B1 | 10/2003 | Nysen |
| 6,708,881 B2 | 3/2004 | Hartmann |
| 2002/0005677 A1* | 1/2002 | Reindl et al. ........... 310/313 D |
| 2002/0017617 A1 | 2/2002 | Schuth et al. |
| 2002/0033576 A1 | 3/2002 | Shinderasky |
| 2002/0140598 A1* | 10/2002 | Stierlin et al. ................ 342/51 |
| 2003/0090664 A1 | 5/2003 | Amonette et al. |

FOREIGN PATENT DOCUMENTS

| | | |
|---|---|---|
| WO | WO90/05409 | 5/1990 |

OTHER PUBLICATIONS

V.A. Vilnrotter, et al.; "The Power Spectrum of Pulse-Position Modulation With Dead Time and Pulse Jitter" TMO Progress Report 42-133; May 15, 1998; pp. 1-5 pg.

Michael Hickey, et al; "Experimental PSK/ASK Transceiver for the STARNET WDM Computer Communication Network" IEEE Photonics Technology Letters vol. 5, No. 5, May 1993; pp. 568-571.

Isao Ozazaki, et al.; "Spread Spectrum Pulse Position Modulation - A Simple Approach for Shannon's Limit-" Singapore ICCS/ISITA, 1992; pp. 300-304.

* cited by examiner

SAW IDENTIFICATION TAG DISCRIMINATION METHODS

CROSS-REFERENCE TO RELATED APPLICATION

This application claims the benefit of U.S. Provisional Application Ser. No. 60/503,136, filed on Sep. 15, 2003, and entitled "Proposal for a Low Cost RFID Tag," commonly assigned with the present invention and incorporated herein by reference.

TECHNICAL FIELD OF THE INVENTION

The present invention is directed, in general, to surface acoustic wave (SAW) identification tag discrimination methods and, more specifically, to an integrated system for isolating an response signal from surface acoustic wave radio frequency identification tags and identifying the information encoded on such tags.

BACKGROUND OF THE INVENTION

To address and overcome inherent existing limitations in prior art radio frequency identification (RFID) tags with respect to cost, data capacity and reliable range, a new technology utilizing SAW devices as identification tags has been developed. SAW tags are described in detail in U.S. patent application Ser. No. 10/024,624, entitled "Surface Acoustic Wave Identification Tag Having Enhanced Data Content and Methods of Operation and Manufacture Thereof," Hartmann, Clinton S., commonly assigned with the invention and incorporated herein by reference. The principles used to encode data on SAW tags involving simultaneous phase and time shift modulation are described in detail in U.S. patent application Ser. No. 10/062,833, entitled "Modulation by Phase and Time Shift Keying and Method of Using the Same," Hartmann, Clinton S., also commonly assigned with the invention and incorporated herein by this reference. The principles used to encode data by combining multi-pulse per group modulation with simultaneous phase and time shift modulation are described in detail in U.S. patent application Ser. No. 10/062,894, entitled "Modulation by Combined Multi-pulse per Group with Simultaneous Phase and Time Shift Keying and Method of Using the Same," Hartmann, Clinton S., also commonly assigned with the invention and incorporated herein by reference. Additional pertinent information regarding SAW identification tags and SAW identification tag readers is set forth in detail in U.S. Pat. No. 6,708,881B1, entitled "Reader for a High Information Capacity Saw Identification Tag and Method of Use Thereof," Hartmann, Clinton S., again commonly assigned with the invention and incorporated herein by reference.

An interrogated RFID tag reflects or retransmits a radio signal in response to an interrogation signal. The returned or reply signal contains data that, when decoded, identifies the tag and any object with which the tag is associated. A SAW device used as an identification tag can be encoded with a large amount of data. When encoded with 64 or 96 bits of data, in accordance with certain electronic product code (EPC) specifications, a reliable system and procedure to accurately identify the tag from a distance is required. Frequently other electronic devices will also be in use in the environment where RFID tags are used. The signals transmitted by these other devices adds to the difficulty in detecting responses to an interrogation pulse.

The problem can be best understood in the context of a user that has a large number of objects, each with its own unique identification tag. Added to the fact that a large number of identification tags are returning signals in response to an interrogation pulse, there most probably are other radio frequency signals present. For example, a SAW identification tag system used in a warehouse or shipping facility will most likely be operated in an environment where a wireless local area network (LAN) is also in operation. To identify a specific object among a large number of objects, an interrogation signal will be transmitted that will simultaneously generate a response from each SAW tag on each object. Not only must the SAW tag reader be able to identify the signals being returned from the SAW identification tags, it must also assure that its interrogation signal and the responses to such signal do not interfere with the wireless LAN. In addition, the SAW tag reader must also be able to cope with any signal interference caused by the wireless LAN. Thus, it is important for SAW tags to be encoded in a manner that permits tags to be readily distinguished from each other. It is equally as important that the SAW tag reader be able to discriminate SAW tag responses from other electronic signals and that signals from the SAW identification tag system not interfere with other devices. Methods are needed to encode and read SAW tags so that the unique data on the SAW tags can readily be distinguished. Methods are also needed to permit a SAW identification tag system to operate in an environment where other signals are present. Methods are also needed that permit the operation of SAW identification tag systems in a manner that does not interfere with other devices.

Accordingly, what is needed in the art are methods to operate and use a SAW identification tag system in an environment with other signal generating electronic devices and still reliably discriminate between multiple SAW tag responses.

SUMMARY OF THE INVENTION

To address the above-discussed deficiencies of the prior art, the present invention provides SAW identification tag discrimination methods including, in one embodiment (1) detecting a signal emanating from an electronic device operating within a SAW tag frequency band; (2) identifying a null period in a transmission pattern in the signal; and (3) effecting communication of information during the null period.

Thus, the present invention provides a method for operating a SAW identification tag system in an environment where other signals are present which may interfere with either the transmission of SAW interrogation pulses or the receipt of reflected responses to such interrogation pulses. The present invention also permits operation in the same environment as other electronic devices, without interfering with the operation of such devices. For example, if a SAW identification tag system is used in a grocery store with an automatic door opening system operating within the ISM frequency range, the methods described herein permit the SAW tag system to detect the signals transmitted by the door opening system and adjust its operation to overcome any interference caused by the door opening system. By the same token, the SAW tag identification system can be operated in the grocery store without causing repeated opening and closing of the doors.

In one embodiment the null period is a frequency null and in another the null period is a time null. When the SAW identification tag system detects conflicting signals, it can communicate during a time null period when the conflicting signal is not present, or, if a frequency null is detected, the system can vary its communication frequency to operate on a non-conflicting frequency.

Because of the importance of being able to operate in the presence of other devices and not interfere with such devices, in another embodiment of the invention a relatively low power setting for communicating SAW tag information is provided. In another embodiment, short transmission bursts are used for communication.

Another embodiment of the invention provides for the SAW identification tag system to communicate data information synchronous with at least one other electronic device emanating a signal within the SAW tag frequency band. In one embodiment, the communication is synchronized based on time while in another it is synchronized based on frequency.

Still another embodiment of the invention provides for a SAW identification tag with at least two SAW tag identification number reflector groups located on its substrate. Also located on the substrate is a first error-checking reflector group dependent upon data contained in one of the at least two tag identification number reflector groups. A second error-checking reflector group is also located on the substrate and is dependent upon data contained in at least a remaining one of the at least two tag identification number reflector groups. Still a third error-checking reflector group on the substrate is dependent upon data contained in the at least the remaining one tag identification number reflector group and the second error-checking reflector group. Yet another embodiment of the SAW identification tag has a synchronizing reflector group on the substrate.

In a variation of the above, another embodiment of the invention provides for a SAW identification tag that has at least one tag identification number reflector group located on a substrate with a first error-checking reflector group dependent upon data contained in the at least one tag identification number reflector group. This embodiment has a second error-checking reflector group located on the substrate that is dependent upon data contained in the at least one tag identification number reflector group and the first error-checking reflector group. Another embodiment provides for the SAW identification tag to also have a synchronizing reflector group on the substrate.

In still another embodiment of the invention a SAW identification tag has a first reflector group located on a substrate with reflectors that have substantially similar first reflection characteristics. A second group of reflectors located on the substrate has substantially similar second reflection characteristics. In another embodiment, the first reflection characteristics and the second reflection characteristics are substantially similar.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following description taken in conjunction with the accompanying drawings, in which.

DETAILED DESCRIPTION

Figure 1:
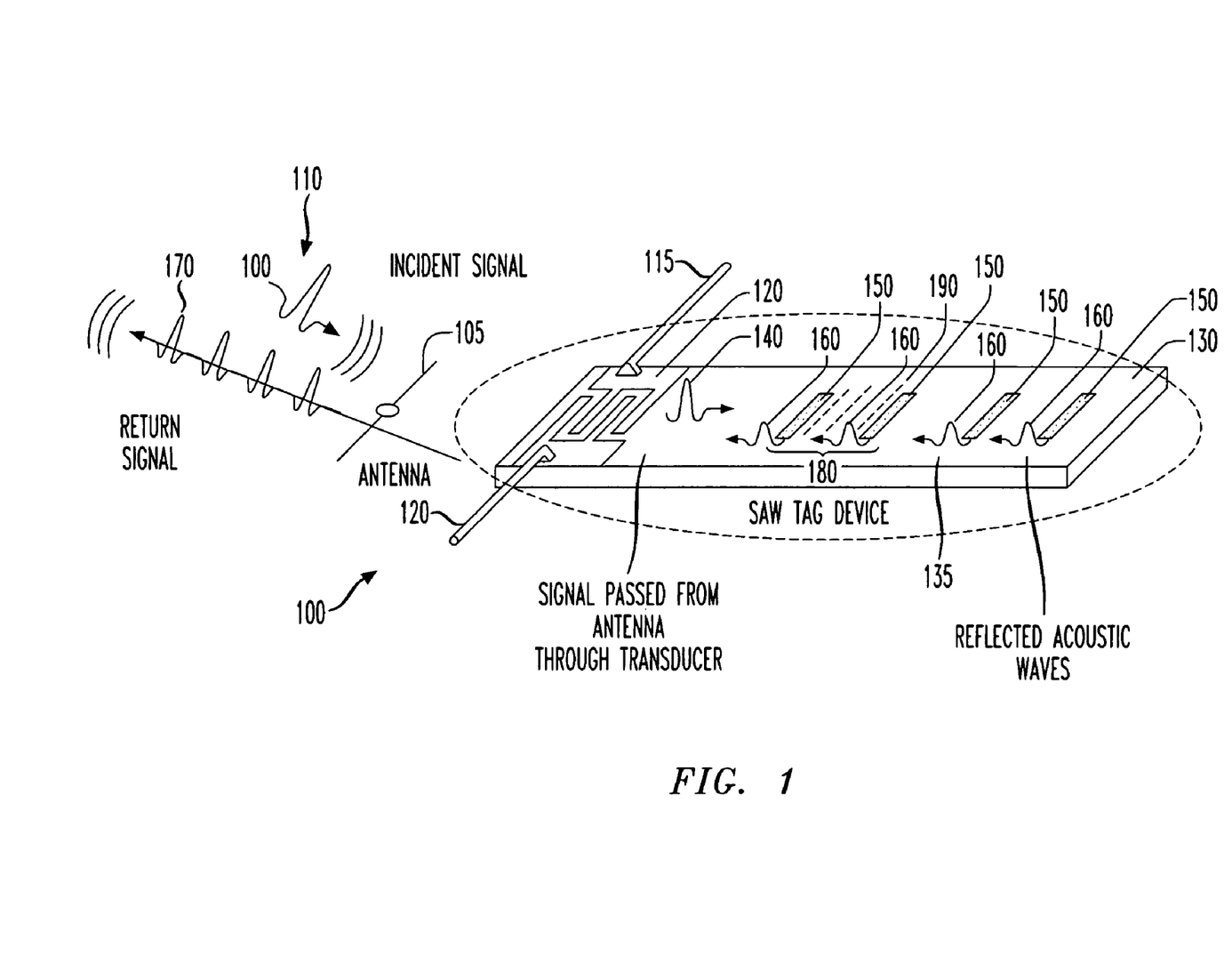
FIG. 1 illustrates a SAW tag of the type used as an RFID tag.

Referring initially to FIG. 1, illustrated is a SAW tag 100 of the type used as an RFID tag. The illustrated embodiment provides for a reader antenna 105 that transmits a radio frequency (RF) interrogation signal 110. The RF signal 110 is received by an antenna 115 on the tag 100 and excites a transducer 120 located on a piezoelectric substrate 130 so that it produces an initial acoustic pulse 140. As the initial acoustic pulse 140 moves down the surface 135 of the substrate 130, it encounters reflectors 150 located thereon, causing a reflection of a portion of the initial acoustic pulse 140. This reflected pulse is herein called a response acoustic pulse 160.

A feature of the illustrated embodiment is that a plurality of reflectors 150 are arranged on the substrate 130 according to time and phase position to yield a plurality of response acoustic pulses 160. When the transducer 120 receives these response acoustic pulses 160, an RF response signal 170 is generated that is transmitted through the antenna 115 to be detected by a reader antenna 105. The SAW tag reader (not illustrated) then determines the identifier in view of predefined time, phase and amplitude parameters detected in the response acoustic pulses 160.

RFID tags, including SAW tags 100, operate within the industrial, scientific and medical (ISM) frequency band. In the United States, this band is 80 MHz wide with a range of 2.40 to 2.483 GHz. Because this band is used for other applications, principally wireless local area networks (LANs) and Bluetooth™ wireless transceivers, SAW tags must be designed to operate in the presence of, and not unduly interfere with, these applications. Although SAW tags 100 may be designed to operate within a limited frequency band, such as 40 MHz of bandwidth, SAW tags 100, themselves, will support, and can operate within, a wider bandwidth.

Because SAW tags 100 are frequently used within the same environment as other applications are operating using the same ISM frequency band, the possibility of frequency interference is present. Operation in the ISM band thus dictates that SAW tags 100 and SAW tag readers be able to operate within an environment where interference exists. It is also important that the operation of a SAW identification tag system not interfere with other applications in the ISM band.

Figure 2:
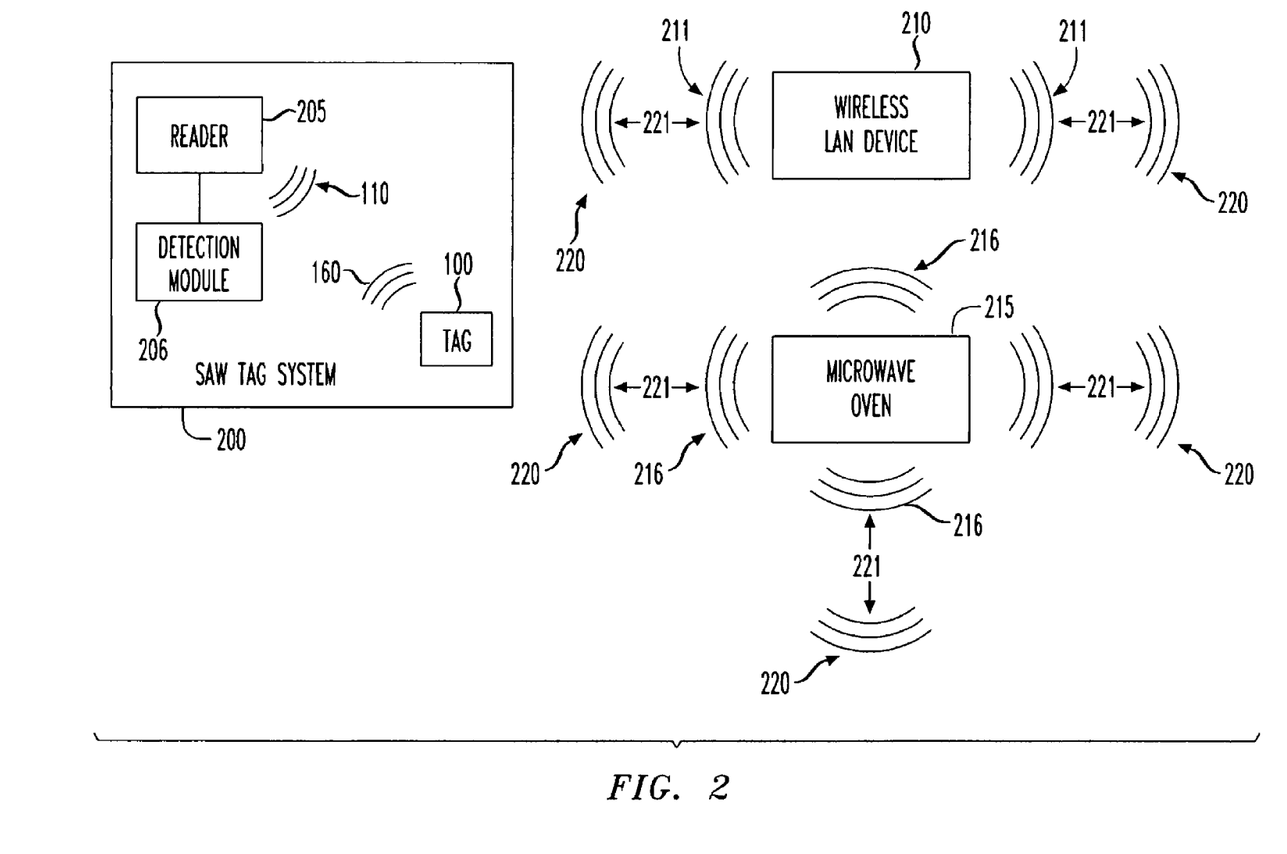
FIG. 2 illustrates a SAW identification tag system operating in an environment where a wireless LAN device and a microwave oven are generating frequencies within the same ISM frequency range of the SAW tag system.

Turning now to FIG. 2, illustrated is a SAW identification tag system 200 operating in an environment where a wireless LAN device 210 and a microwave oven 215 are operating within the same ISM frequency range. Coupled to the SAW tag reader 205 is a detection module 206 that detects the signals 211, 216 emanating from the wireless LAN device 210 and the microwave oven 215. The detection module 205 also detects and identifies a null period 221 in the transmission pattern 220 of the wireless LAN device 210 and the microwave oven 215. The null period 221 may be either a time null period 221 when no signal 211, 216 is transmitted, or it may be a frequency null period where a frequency within the ISM band is identified where no signal is being transmitted. The SAW tag reader 205 uses this information to effect a communication of information by either communicating when the conflicting signal 211, 216 is not transmitted, or it can change to a null frequency within the ISM range and use that frequency to communicate.

For example, if the SAW tag reader 205 detects a conflicting signal 211 from a LAN device 210, it can synchronize its operation to the operation of the LAN device 210 and become active only during periods of LAN device 210 inactivity. In the case of the microwave oven 215, which typically operates with 50% duty cycles with 8 millisecond periods of inactivity the SAW tag reader can operate within the periods of inactivity. A SAW tag reader 205 only needs a few microseconds to transmit an interrogation signal 110 and receive response acoustic pulses 160, which permits it to transmit and read many signals within such 8 millisecond inactive period. Another characteristic of a microwave oven 215 is that it typically operates within relatively narrow bands of energy that are swept across the ISM band during the 8 millisecond activity period. A SAW tag reader 205 can detect the narrowband of energy and avoid those bands while measuring SAW tag responses at other frequencies, even while the Microwave oven 215 is active. In a similar fashion, other applications such as wireless LANs and Bluetooth have significant inactivity times and use only a portion of the total ISM frequency band when they are active. As mentioned above a SAW tag reader 205 can sense the inactive frequency bands and inactive time intervals to ensure reliability of SAW tag reads while simultaneously preventing intrusion into other ISM applications.

While operating in an environment where other devices are present, such as a wireless LAN device 210, it is important that the SAW tag system 200 not interfere with such device. To avoid generating undo interference, a SAW tag reader 205 can be designed to generate relatively low power with very short duration pulses. The combination of low power and short burst implies that, in most instances, a SAW tag reader will not impair wireless LAN devices or Bluetooth™ applications.

Where a SAW tag reader 205 is coexisting with another device such as a wireless LAN device 210, the SAW tag reader 205 can also be synchronized so that it effects communication with a SAW tag 100 synchronous with the signal emanating from the device. This synchronization can be by time, frequency or both. The SAW tag system 200 can also be enhanced so that when the SAW tag reader 205 detects the presence of another system, such as a wireless LAN device 210, it interoperates with such system and is totally compatible with such device's access protocols.

Figure 3:
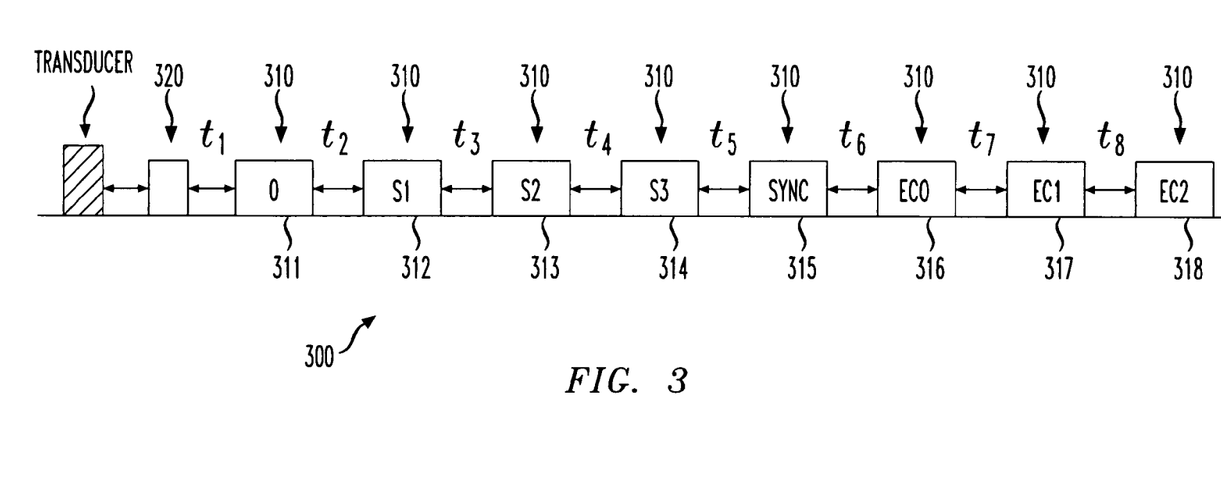
FIG. 3 illustrates a representative embodiment of a SAW tag showing the layout of a SAW tag platform with groups of reflector locations on the substrate.

Turning now to FIG. 3, illustrated is a representative embodiment of a SAW tag 100 showing the layout of a SAW tag platform 300 with groups 310 of reflector locations on the substrate. In the illustrated layout 300, a preamble 320 precedes data groups 310 and provides for functions such as frame and phase synchronization as well as providing data space for SAW tag version information. The groups 310 are separated by time values 315 (labeled $t_1$ through $t_8$). Each time value 315 interval represents the time between the center of the last reflector position in one group 310 to the center of the first reflector position of the next group 310.

Eight reflector groups 310 are represented. This represents a generic SAW tag platform 300 with a basic 128-bit encoding structure. Some of the groups 310 convey payload data codes while other groups 310 are used for synchronization and error checking. In the instant case, group 311 thru and including group 314 are used to encode payload data or SAW tag identification number data. For purposes of explanation, assume a 64-bit format payload platform is used with four payload groups, Payload0 311, S1 312, S2 313 and S3 314. Group 315 is the synchronization group and the error check groups are EC0 316, EC1 317 and EC2 318. The error check structure described herein involves two useful concepts: error check separation and error check nesting. Thus, EC0 316 performs an error check on different data than EC1 317 and EC2 318 and is, thus, totally separate from EC1 317 and EC2 318. The use of separate error checks facilitates manufacturing processes by allowing shared use of EC0 dependent masks with multiple mask sets designed for different higher order data fields (e.g. different manager and object fields). EC1 317 and EC2 318, on the other hand, are nested. EC2 318 performs an error check of the same data as EC1 317 and on EC1 317 as well. Thus, the combination of EC1 317 and EC2 318 is, in effect, a form of a 32-bit error check. The nested design is more flexible than a conventional 32-bit error check because EC1 317 can be used strictly for code space separation (i.e. processing gain) while EC2 318 is used strictly for error checking. In applications wherein the processing gain is unnecessary, the EC1/EC2 317, 318 combination can be used for 32-bit error checking.

Thus the present invention provides, in one embodiment, for a SAW identification tag 100 that has at least two tag identification number or payload reflector groups 311-14 (Payload0 311, S1 312, S2 313 and S3 314) located on its substrate. Also located on the substrate is a first error-checking reflector group (EC0 316) that is dependent upon data contained in one of the at least two tag identification number reflector groups 311-14, in this case S3 314. A second error-checking reflector group (EC1 317) is also located on the substrate and is dependent upon data contained in SAW tag identification number reflector groups Payload0 311, S1 312 and S2 313. While still a third error-checking reflector group (EC2 318) on the substrate is dependent upon data contained in the at least remaining one tag identification number reflector group (Payload0 311, S1 312 and S2 313) and EC 1 317, the second error-checking reflector group.

Figure 4:
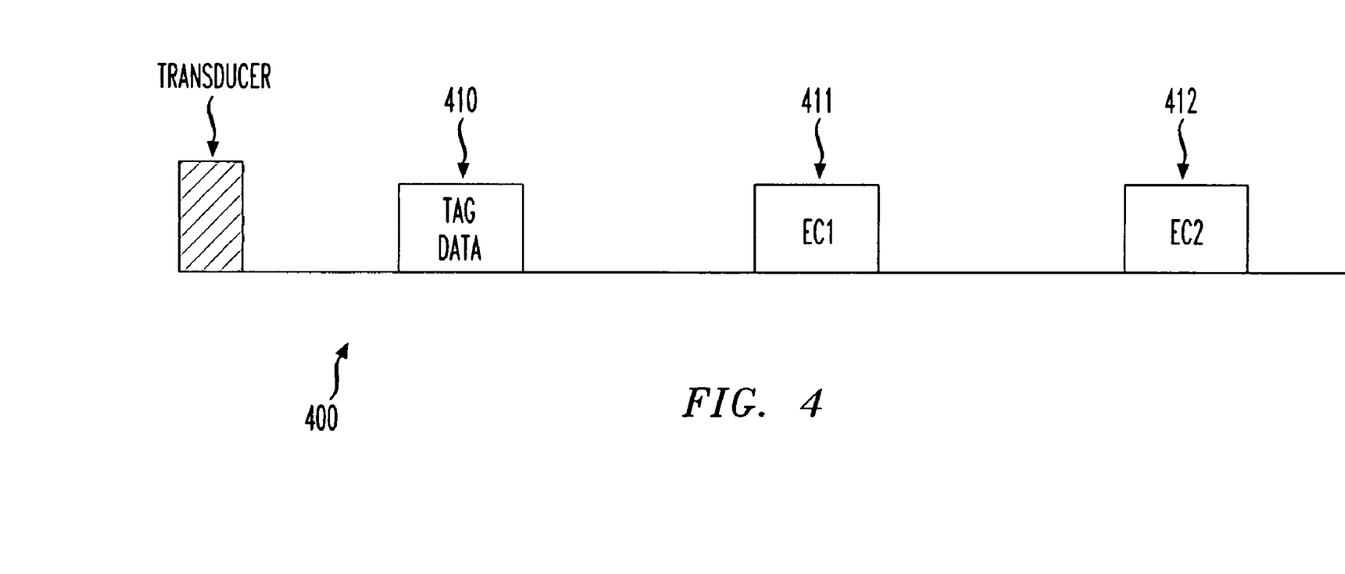
FIG. 4 illustrates a SAW tag platform using a "nested" error check protocol.

Referring now to FIG. 4, illustrated is a SAW tag platform 400 using a "nested" error check protocol. The SAW tag platform 400 has at least one tag identification number reflector group 410 located on a substrate. A first error-checking reflector group 411 is dependent upon data contained in the at least one tag identification number reflector group 410. A second error-checking reflector group 412 is located on the substrate that is dependent upon data contained in the at least one tag identification number reflector group 410 and the first error-checking reflector group 411.

Figure 5:
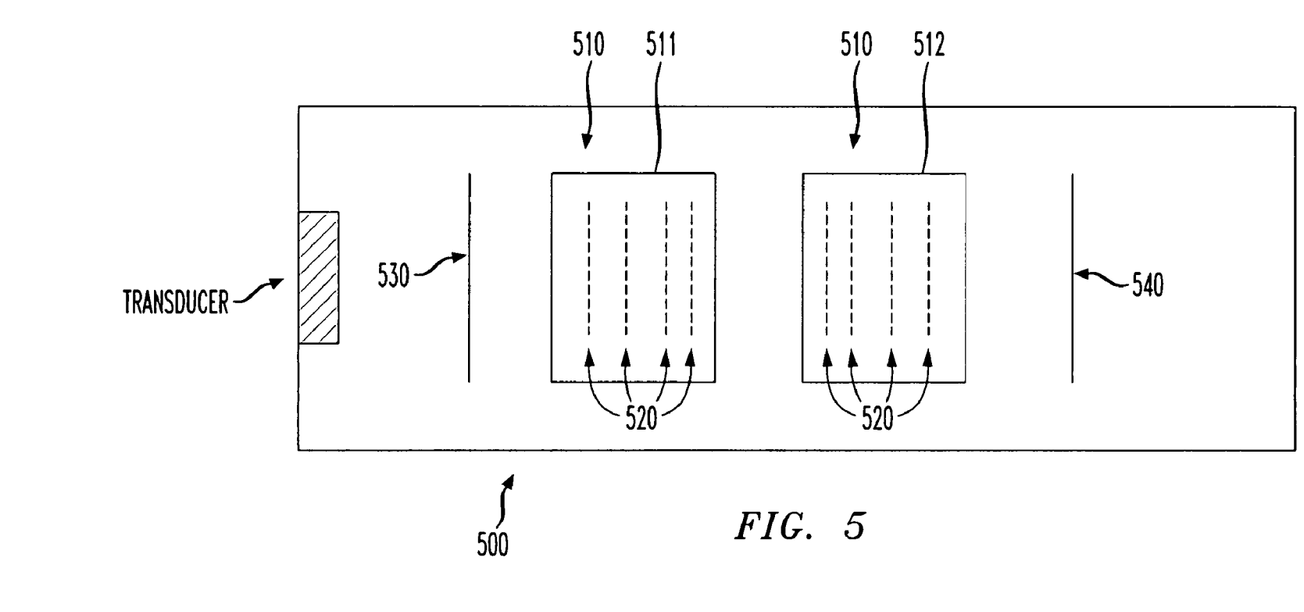
FIG. 5 illustrates a SAW tag substrate with multiple reflector groups having multiple reflectors in each group.

Referring now to FIG. 5, illustrated is a SAW tag substrate 500 with multiple reflector groups 510 having multiple reflectors 520 in each group 510. In the interest of encoding multiple data bits with a small number of SAW reflections, data is encoded using pulse positions. Because allowable pulse positions are more finely spaced than the width of an interrogation pulse, pulse position is difficult to discern using only time of arrival detection. Additional discrimination between pulses is achieved by encoding different pulse positions with differing reflected phases. To this end, successive pulses are encoded with successive increments of a phase step.

Assuming the first pulse position is encoded with a reference phase of zero degrees, successive pulse positions are encoded with successive multiples of the phase step. Although the phase of a particular reflector 520 is independent of other active reflectors 520, the actual phase of a particular reflector 520 is dependent on the number of active reflectors 520 preceding it. An important consideration in designing a SAW tag is to minimize the dependence of the phase of a particular pulse on the presence or absence of pervious pulses. This dependence is minimized by making all reflectors in a group identical.

Thus, one embodiment of the present invention provides for a SAW tag substrate that has a first group 511 of reflectors 520 located on a substrate with all the reflectors 520 in such first group 511 having substantially similar first reflection characteristics. A second group 512 of reflectors 520 located on the SAW tag substrate 500 also has substantially similar second reflection characteristics. In another embodiment, the first reflection characteristics and the second reflection characteristics are substantially similar.

This embodiment is useful in that the starting phase of a signal for subsequent groups is independent of which particular reflectors are active in preceding groups. Use of identical, or nearly identical, reflectors 520 across multiple groups 510 is also beneficial in that it produces early return pulses with higher amplitudes than later return pulses. Stronger amplitude early pulses are desirable because environmental echoes are stronger near the start of a SAW tag response than they are near the end.

Also illustrated in FIG. 5 is a start reflector 530 located in front of the first reflector group 510 that carries a basic data load. A start reflector 530 located about 100 nanoseconds in front of the first slot in the first data carrying reflector group 510 can be used to enhance data synchronization and to measure multi-path reflections in the reading environment. Once the multi-path has been characterized by observing the tag response of this single isolated start-of-tag pulse, the effects of the multi-path can be removed in subsequent data detection processes.

Also shown is an end-of-tag reflector 540 located after the last active data group 510. The end-of-tag reflector 540 produces an output pulse at a fixed time of a predetermined number of slots and is located after the last slot position of the last data group 510. In addition to using the direct reflection of the end-of-tag reflector 540 for additional synchronization information, it contributes to useful tertiary reflections involving data reflectors near the end of the SAW tag. The additional return from the end-of-tag reflector enhances the SAW tag reader's ability to detect the acoustic signal return, a particularly useful feature because the first reflections from the reflectors near the end of the SAW tag substrate are typically lower in amplitude than reflections from the early reflectors.

An additional advantage of an end-of-tag reflector is its use in relatively short SAW tags. A SAW tag with two data groups can use the end-of-tag reflector in lieu of the Sync code and error correcting codes. The secondary responses of the information tags provide a time-reflected synchronization signal and, because of the redundancy, provide a form of a signal integrity check to add to the confidence of valid SAW tag presence.

Although the present invention has been described in detail, those skilled in the art should understand that they can make various changes, substitutions and alterations herein without departing from the spirit and scope of the invention in its broadest form.

What is claimed is:

1. A method of communicating surface acoustic wave (SAW) identification tag information, comprising:
    detecting a signal emanating from an electronic device operating within a SAW tag frequency band;
    identifying a null period in a transmission pattern in said signal; and
    effecting communication of said information during said null period.

2. The method as recited in claim 1 wherein said null period is a frequency null period.

3. The method as recited in claim 1 wherein said null period is a time null period.

4. A method of communicating surface acoustic wave (SAW) identification tag information to avoid signal interference with another device operating within the same frequency band, comprising:
    effecting communication of said information using low power relative to said another device;
    causing said effecting communication to occur in signal bursts.

5. The method as recited in claim 4 further comprising utilizing frequency shift to determine the timing of said signal bursts.

6. A method of communicating SAW identification tag information, comprising:
    detecting at least one other signal emanating from an electronic device operating within a SAW tag frequency band; and
    effecting communication of said information synchronous with said at least one other signal such that said communication occurs during an interval when said at lest one other signal is inactive.

7. The method as recited in claim 6 wherein said effecting communication is synchronous in time.

8. The method as recited in claim 6 wherein said effecting communication in synchronous in frequency.

9. A SAW identification tag, comprising:
    at least two tag identification number reflector groups located on a substrate;
    a first error-checking reflector group located on said substrate and dependent upon data contained in one of said at least two tag identification number reflector groups;
    a second error-checking reflector group located on said substrate and dependent upon data contained in at least a remaining one of said at least two tag identification number reflector groups; and
    a third error-checking reflector group located on said substrate and dependent upon data contained in said at least said remaining one tag identification number reflector group and said second error-checking reflector group.

10. A SAW identification tag, comprising:
    at least one tag identification number reflector group located on a substrate;
    at least one synchronizing reflector group located on said substrate, said at least one synchronizing reflector group being a mirror image of said at least one tag identification number reflector group.

11. A SAW identification tag, comprising:
at least one tag identification number reflector group located on a substrate;
a first error-checking reflector group located on said substrate and dependent upon data contained in said at least one tag identification number reflector group; and
a second error-checking reflector group located on said substrate and dependent upon data contained in said at least one tag identification number reflector group and said first error-checking reflector group.

12. A SAW identification tag, comprising:
a first group of a plurality of reflectors located on a substrate and having substantially similar first reflection characteristics; and
a second group of a plurality of reflectors located on said substrate having substantially similar second reflection characteristics, said first reflection characteristics and said second reflection characteristics being substantially similar.

13. A SAW identification tag, comprising:
a substrate having a group of reflectors located thereon; and
an end-of-tag reflector located to generate a reflected response to a SAW tag interrogation signal after each reflector in said group of reflectors generates a reflected response to said interrogation signal, wherein said end-of-tag reflector reflects substantially all of said interrogation signal.

14. The SAW identification tag as recited in claim 13 wherein said end-of-tag reflector generates a reflected interrogation signal that generates response pulses from said reflectors.

* * * * *